Patented Oct. 27, 1931

1,829,208

UNITED STATES PATENT OFFICE

WALTER BAUER, OF DARMSTADT, GERMANY, ASSIGNOR TO RÖHM & HAAS AKTIEN-GESELLSCHAFT, OF DARMSTADT, GERMANY, A CORPORATION OF GERMANY

PROCESSES OF PRODUCING ACRYLIC ACID ESTERS

No Drawing. Application filed May 27, 1929, Serial No. 366,536, and in Germany June 18, 1928.

My invention relates to processes of producing acrylic acid ester.

The saponification of nitriles in the presence of an acid is well known, and by well-known process nitriles can also be directly esterified. Moreover, it is old, to convert hydroxyl containing substances by means of agents which split off water into unsaturated compounds.

Now, I have found that hydroxyl containing nitriles, the hydroxyl group of which is in the β-position, in the presence of agents which split off water can in a single operation be esterified in an acid medium by being heated to temperatures, at which water is split off, while at the same time unsaturated esters are formed. If, for instance, concentrated sulphuric acid is employed as the agent for splitting off water, 120° to 170° C. have been found to be suitable temperatures for the present purpose.

Further, I have found that the process by the use of small amounts of water can be expedited. Such amounts of water can, for instance, be introduced into the process by the use of concentrated acids having a small water content.

Example 43 kilograms of ethylene cyanhydrin are carefully mixed with 35 kilograms of methanol and 85 kilograms of sulphuric acid having a specific gravity of 1.80 and are gradually heated to 160° C. while being stirred. First, some methanol distills off, having mixed therewith slight amounts of acrylic acid ester and water. Thereupon, an acrylic acid ester of a rather high percentage mixed with water and methanol results. Because the water also distills off, the process is practically complete and one succeeds in obtaining an output of about 90% of acrylic acid ester.

The process can be practiced at atmospheric pressure or at a pressure different therefrom.

In place of the hydroxyl containing nitriles (e. g. cyanhydrin), their derivatives, e. g. amides or β-alkoxid compounds can be used.

I claim:

1. The process of producing acrylic acid ester which consists in converting aliphatic β-hydroxy-nitriles into unsaturated esters in the presence of aliphatic mono-hydroxy alcohol and an acid medium which splits off water.

2. The process as specified in claim 1, in which a temperature of 120°–170° C. is maintained.

3. The process as specified in claim 1, in which ethylene cyanhydrin is used as initial substance.

In testimony whereof I affix my signature.

WALTER BAUER.